Sept. 3, 1968   H. O. LARSON   3,399,924
COLLAPSIBLE ROOF
Filed March 6, 1967
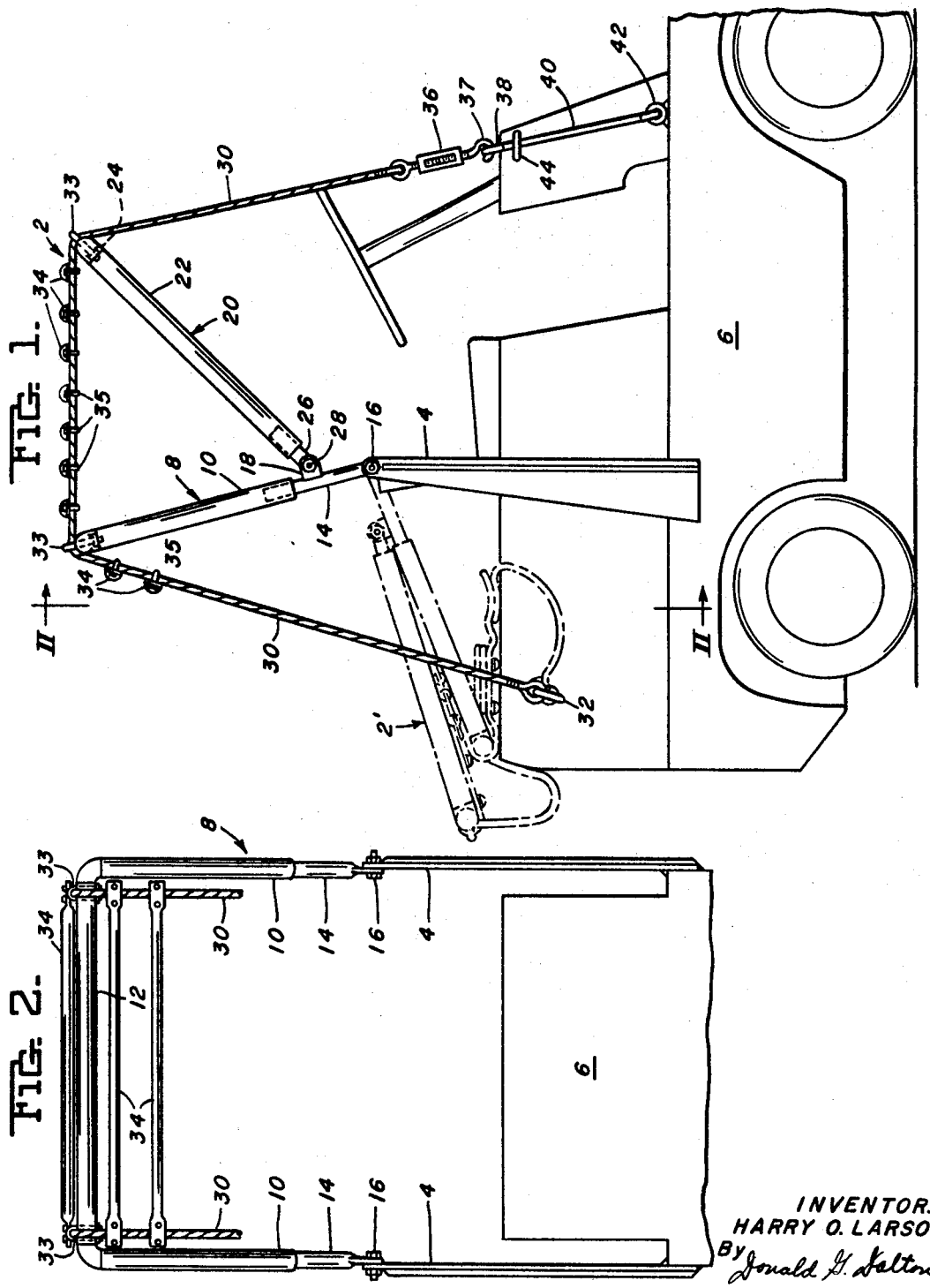
INVENTOR.
HARRY O. LARSON
By Donald G. Dalton
Attorney United States Patent Office 3,399,924
Patented Sept. 3, 1968

3,399,924
COLLAPSIBLE ROOF
Harry O. Larson, Superior, Wis., assignor to United States Steel Corporation, a corporation of Delaware
Filed Mar. 6, 1967, Ser. No. 620,859
8 Claims. (Cl. 296—111)

ABSTRACT OF THE DISCLOSURE

A collapsible roof, primarily intended for use on industrial lift trucks. U-shaped support members are pivotally connected in an upside down position to the truck body. Wire ropes are strung over these U-shaped members, and metal cross-bars are connected between the ropes. The ropes are pulled tight and secured at either end to the truck body so that the metal cross-bars provide a protective roof for the driver of the truck.

---

This invention relates to a collapsible roof having a variety of applications, but primarily intended for attachment to an industrial fork lift truck.

In many industrial areas where fork lift trucks are used, prudent safety rules require that overhead guards be provided on the lift trucks for the operator's protection. However, these lift trucks must also travel into cramped areas where there is low overhead room, such as inside the van portion of a hauling truck. When the lift truck enters such a low overhead area, the overhead guard provided by the safety rules must frequently be removed or collapsed.

In the past, collapsible roofs or overhead guards for lift trucks have been made entirely of rigid members, for adequate protection of the operators of the trucks from heavy falling objects. Such roofs are cumbersome in that they extend a substantial distance beyond the rear of the lift trucks when collapsed. They make the trucks hard to turn in narrow aisles and they are prone to damage from bumps and collisions with other objects in the plant area.

An object of my invention is to provide a collapsible roof, primarily for use with industrial lift trucks, which will provide adequate protection from heavy falling objects, yet will be easily collapsible into a compact bundle that will not extend too far beyond the rear of the lift truck.

This and other objects will be more apparent from the following description of my invention and the attached drawings in which:

FIGURE 1 is a side elevational view of a collapsible roof mounted on an industrial lift truck; and FIGURE 2 is a rear elevational view of the collapsible roof and lift truck of FIGURE 1.

Referring to the drawings, a collapsible roof 2 includes two steel brackets 4 which are fixed to either side of an industrial lift truck 6.

Pivotally connected to the tops of the steel brackets 4 are the ends of a rigid U-shaped support member 8, which is made of a pair of laterally spaced apart, elongated, rigid support members 10 joined together by a rigid cross-member 12. Both the rigid support members 10 and the cross-member 12 are made of steel tubing. The rigid support members 10 also include forged end pieces 14 inserted within and welded to the ends of the steel tubing. The end pieces 14 are pivotally connected to the steel brackets 4 by bolts 16.

As seen in FIGURE 1, the forged end pieces 14 each have a flange 18 to which is connected an end of another rigid U-shaped support member 20. The support member 20 has the same basic construction as support member 8, being made of a pair of laterally spaced apart, elongated, rigid support members 22 connected together by a rigid cross-bar 24. The rigid support members 22 and cross-bar 24 are made of steel tubing, and forged end pieces 26 are welded to the steel tubing of support members 22. The end pieces 26 are pivotally connected to flanges 16 by bolts 28.

The foregoing described rigid U-shaped support members 8 and 20 and steel brackets 4 form the basic load-carrying framework of the collapsible roof 2. The loads and shock forces absorbed by the roof from falling objects are transmitted by the U-shaped support members 8 and 20 to the steel brackets 4, which in turn transmit the load to the central portion of the body of the lift truck 6.

Two flexible high-strength wire ropes 30 are anchored at the rear of the lift truck 6 by pad eyes 32, and the ropes are strung from these pad eyes over the tops of the U-shaped support members 8 and 20. U bolts 33 fix the ropes 30 to the U-shaped support members 8 and 20, and these U bolts are tightened so that the ropes 30 do not slip through them.

Between the ropes 30 are connected a plurality of cross-bars 34 which serve as the main protection and covering means provided by the roof 2. The cross-bars 34 are preferably made from tubular steel stock and their ends are secured to the ropes 30 by U bolts 35. When falling objects strike the cross-bars 34, the resulting forces are transmitted by the bars 34 to wire ropes 30, which in turn transmit the forces to the U-shaped support members 8 and 20.

At their front ends, the ropes 30 are connected to turnbuckles 36, which are used to adjust the tension in the ropes 30. Hooks 37 project from turnbuckles 36 and are easily attachable to and detachable from eyelets 38 of extension rods 40. Pad eyes 42 connect the extension rods 40 to the front portion of lift truck 6. U bolts 44 mounted on the truck 6 surround the extension rods 40 and keep them from falling downward when the hooks 37 are detached from eyelets 38.

The roof 2 is shown in its collapsed, chain-line position 2' in FIGURE 2. Due to the use of the flexible wire ropes 30 as the longitudinal support members of the roof, a compact bundle is formed at the rear of the truck 6 when the roof is collapsed.

In operation, the roof 2 is erected from its collapsed position by raising the U-shaped support members 8 and 20 until the ropes 30 are fairly taut, as shown in FIGURE 2. Then, hooks 37 are connected to eyelets 38 of extension rods 40 to hold the roof in its erected position. Tension in the ropes 30 is adjusted by turning turnbuckles 36. The ropes 30 should be fairly tight, so that they will not sag should a heavy object strike the cross-bars 34.

While one embodiment of my invention has been shown and described herein, other adaptations and modifications will be course be apparent within the scope of the appended claims.

I claim:
1. A collapsible roof for attachment to a base article comprising
   (a) a pair of laterally spaced apart, elongated, rigid support members,
   (b) means for pivotally connecting said support members to said base article on a pivotal axis extending laterally between the support members,
   (c) a pair of elongated, flexible members,
   (d) means for connecting a middle portion of one of said flexible members to one of said rigid support members and means for connecting a middle portion of the other of said flexible members to the other of said rigid support members,
   (e) a plurality of substantially parallel, elongated, rigid cross-bars each connected between said elongated flexible members,

(f) means for anchoring the ends of said flexible members to said base article, so that said rigid cross-bars connected between said flexible members form a roof over said base article, supported in the middle by said rigid support members.

2. The collapsible roof of claim 1 including a rigid cross-member secured between said laterally spaced apart, elongated, rigid support members, thereby forming with said rigid support members a unitary U-shaped support member.

3. The collapsible roof of claim 1 wherein said means for connecting the middle portions of said flexible members to said support members are in the form of secure clamp means that prevent the support members from sliding along the flexible members.

4. The collapsible roof of claim 3 comprising also
(g) a second pair of laterally spaced apart, elongated, rigid support members,
(h) means for pivotally connecting said second pair of rigid support members to said base article on a second pivotal axis extending laterally between the second pair of rigid support members, and
(i) means for connecting a second middle portion of one of said flexible members to one of said second pair of rigid support members and means for connecting a second middle portion of the other of said flexible members to the other of said second pair of support members.

5. The collapsible roof of claim 4 wherein said means for pivotally connecting said second pair of rigid support members to said base article includes a pivotal connection of said second pair of rigid support members to the first-mentioned pair of rigid support members.

6. The collapsible roof of claim 4 including a rigid cross-member secured between the support members of each of said pairs of laterally spaced apart, elongated, rigid support members, thereby forming with said rigid support members unitary, U-shaped support members.

7. The collapsible roof of claim 1 wherein the means for anchoring one end of each of said flexible members to said base article includes a hook member and eye member detachable from one another to facilitate the erection and collapsing of said roof.

8. The collapsible roof of claim 1 including means for adjusting the tension in said flexible members when said means for anchoring the flexible members to said base article is secured.

References Cited

UNITED STATES PATENTS

| | | | |
|---|---|---|---|
| 169,579 | 11/1875 | Power et al. | 296—111 |
| 210,128 | 11/1878 | Kuntz et al. | 296—111 |

BENJAMIN HERSH, *Primary Examiner.*

R. SONG, *Assistant Examiner.*